(12) United States Patent
Lee

(10) Patent No.: US 8,190,330 B2
(45) Date of Patent: May 29, 2012

(54) MODEL BASED PREDICTIVE CONTROL FOR AUTOMATED LANE CENTERING/CHANGING CONTROL SYSTEMS

(75) Inventor: Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 566 days.

(21) Appl. No.: 12/399,317

(22) Filed: Mar. 6, 2009

(65) Prior Publication Data

US 2010/0228420 A1  Sep. 9, 2010

(51) Int. Cl.
*G05D 3/00* (2006.01)
(52) U.S. Cl. ............... 701/44; 701/26; 701/301; 342/71
(58) Field of Classification Search .......... 701/1, 23–27, 701/41, 43, 44, 301, 302; 342/70–72
See application file for complete search history.

(56) References Cited

U.S. PATENT DOCUMENTS

| | | | | |
|---|---|---|---|---|
| 5,390,118 | A * | 2/1995 | Margolis et al. | 701/23 |
| 5,781,870 | A * | 7/1998 | Okawa | 701/25 |
| 6,134,491 | A * | 10/2000 | Kawagoe et al. | 701/43 |
| 6,317,057 | B1 * | 11/2001 | Lee | 340/901 |
| 6,748,302 | B2 * | 6/2004 | Kawazoe | 701/1 |
| 7,711,464 | B2 * | 5/2010 | Kaufmann | 701/41 |
| 7,778,758 | B2 * | 8/2010 | Tsuchiya et al. | 701/93 |
| 2004/0193374 | A1 * | 9/2004 | Hac et al. | 701/301 |
| 2006/0145827 | A1 * | 7/2006 | Kuge et al. | 340/439 |
| 2009/0157263 | A1 * | 6/2009 | Shin | 701/43 |

OTHER PUBLICATIONS

Deng, W. and Lee, Y.H., U.S. Patent Application entitled "Vehicle Dynamics Prediction with Lane/Path Information using a Preview-Correction-Prediction Approach", U.S. Appl. No. 12/275,978, filed Nov. 21, 2008.
Lee, J., U.S. Patent Application entitled "Path Generation Algorithm for Automated Lane Centering and Lane Changing Control System", U.S. Appl. No. 12/143,439, filed Jun. 20, 2008.
Hatipoglu, C., Ozguner, U. and Redmill, K., "Automated Lane Change Controller Design", IEEE Transactions on Intelligent Transportation Systems, vol. 4., No. 1, Mar. 2003.

* cited by examiner

*Primary Examiner* — Paul N Dickson
*Assistant Examiner* — Timothy Wilhelm
(74) *Attorney, Agent, or Firm* — John A. Miller; Miller IP Group, PLC

(57) ABSTRACT

A system and method for providing steering control for lane changing and lane centering purposes in an autonomous or semi-autonomous vehicle system. A vehicle vision system calculates roadway lane marking information, such as lateral offset, yaw angle and roadway curvature with respect to the vehicle's centered coordinate system. The roadway is then modeled as a second order polynomial equation. The method then predicts roadway lateral position and yaw angle over a pre-defined lane change completion time using a vehicle dynamic model. The method then compares a predicted vehicle path with a desired vehicle path to generate an error value, and calculates a steering angle command to minimize the error value, where the steering angle command is calculated as a function of vehicle lateral position, vehicle lateral speed, vehicle yaw rate and vehicle yaw angle. The steering angle command is then sent to the vehicle steering system.

17 Claims, 3 Drawing Sheets

MODEL BASED PREDICTIVE CONTROL FOR AUTOMATED LANE CENTERING/CHANGING CONTROL SYSTEMS

BACKGROUND OF THE INVENTION

1. Field of the Invention

This invention relates generally to a system and method for providing steering angle control for lane centering and lane changes in an autonomously driven vehicle and, more particularly, to a system and method for providing steering angle control for lane centering and lane changing in an autonomously driven vehicle where a steering angle command is calculated as a simplified function of vehicle lateral position, vehicle lateral speed, vehicle yaw rate and vehicle yaw angle.

2. Discussion of the Related Art

The operation of modern vehicles is becoming more autonomous, i.e., the vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a completely autonomously driven vehicle. For example, future vehicles probably will employ autonomous systems for lane changing, passing, turns away from traffic, turns into traffic, etc. As these systems become more prevalent in vehicle technology, it will also be necessary to determine what the driver's role will be in combination with these systems for controlling vehicle speed and steering, and overriding the autonomous system.

U.S. patent application Ser. No. 12/143,439, titled "Path Generation Algorithm for Automated Lane Centering and Lane Changing Control System", assigned to the assignee of this application and herein incorporated by reference, discloses a system and method for providing path generation for lane centering and lane changing purposes in an autonomous or semi-autonomous vehicle. However, in order to be fully functional, the system needs to generate a steering angle in response to the path generation so that the vehicle follows the desired path. Systems known in the art that provide steering angle commands in autonomous vehicle systems typically are complex.

SUMMARY OF THE INVENTION

In accordance with the teachings of the present invention, a system and method are disclosed for providing steering control for lane changing and lane centering purposes in an autonomous or semi-autonomous vehicle system. A vehicle vision system calculates roadway lane marking information, such as lateral offset, yaw angle and road curvature with respect to the vehicle's centered coordinate system. The roadway is then modeled as a second order polynomial equation. The method then predicts roadway lateral position and yaw angle over a pre-defined lane change completion time using a vehicle dynamic model. The method then compares a predicted vehicle path with a desired vehicle path to generate an error value, and calculates a steering angle command to minimize the error value, where the steering angle command is calculated as a function of vehicle lateral position, vehicle lateral speed, vehicle yaw rate and vehicle yaw angle. The steering angle command is then sent to the vehicle steering system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing steering angle control for lane centering or lane changing purposes in an autonomous or semi-autonomous vehicle is merely exemplary in nature, and is in no way intended to limit the invention or its applications or uses.

Figure 1:
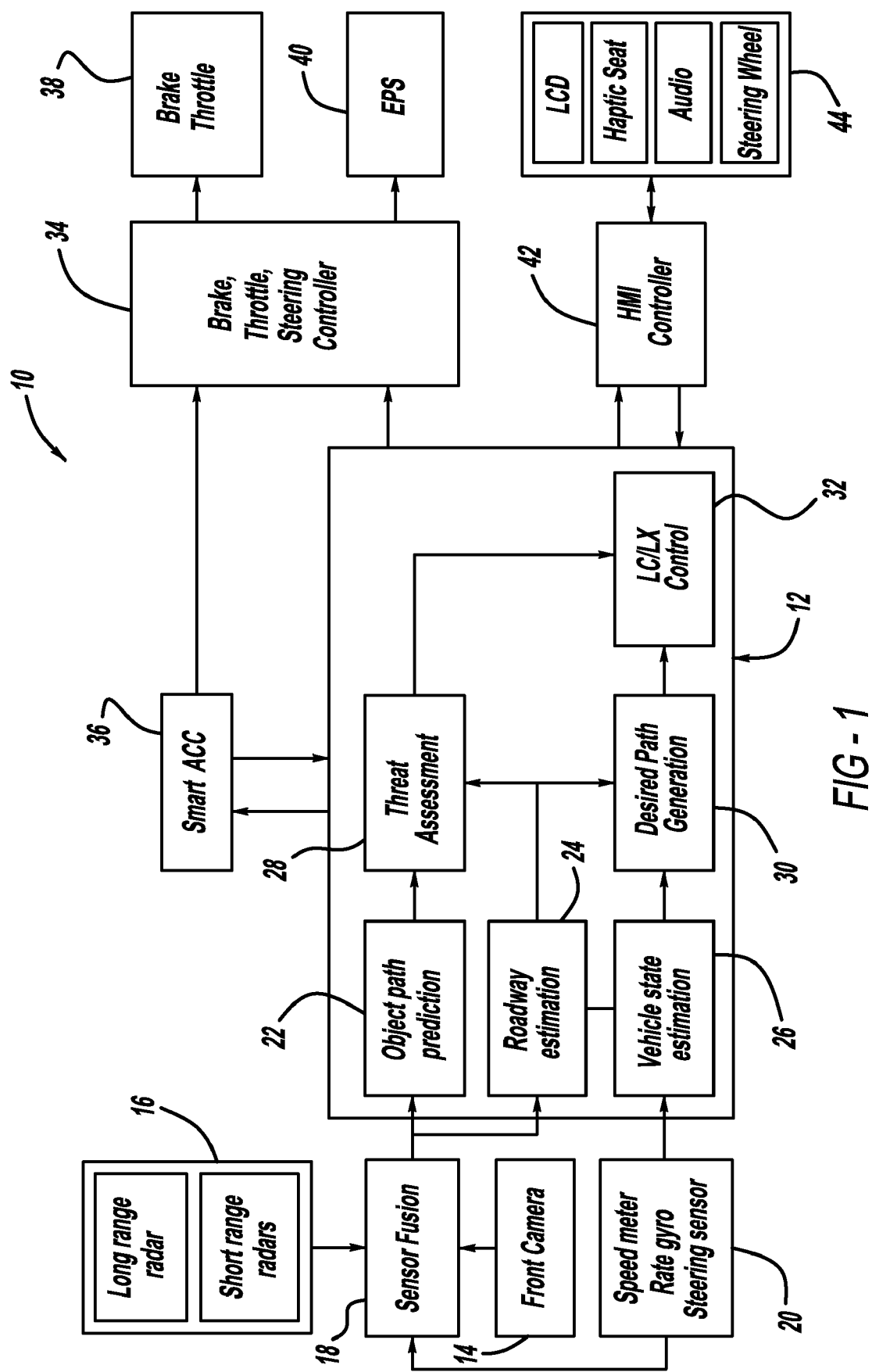
FIG. 1 is a schematic block diagram of systems and sub-systems in an autonomous or semi-autonomous vehicle including an LXACC system.

FIG. 1 is an illustration of a vehicle system 10 including a lane change adaptive cruise control (LXACC) core algorithm 12 that includes lane centering and lane changing control, as will be discussed in detail below. Known LXACC systems provide a unified framework for automated lateral motion control, such as automated lane changing and lane centering functions. Because the lateral dynamics of a vehicle are related to the vehicle's longitudinal motion, the longitudinal motion control is usually considered in the same framework.

The system 10 includes a forward vision camera 14 and long range and short range radars 16 that detect road lane markings and neighboring objects around the vehicle and provide the object information in the format of range, range rate and azimuth angle. The lane marking information and the object information are provided to a sensor fusion sub-system 18 along with other sensor information from vehicle sensors 20, such as vehicle speed, gyroscope, steering angle, etc. The sensor signals from the sensors 20, can be combined with the roadway representations to enhance the roadway profile prediction and the vehicle motion state estimation of lateral speed, yaw rate, lateral offset and heading angle. The sensor fusion sub-system 18 provides filtering and post processing of the raw sensor data. The sensor fusion sub-system 18 also groups the detected objects, tracks them and reports the object location and relative speed in Cartesian coordinates. After the post-processing, the sensor fusion sub-system 18 provides signals that represent the roadway with vehicle lateral offset and heading angle with respect to the current lane the vehicle is traveling along.

The LXACC core algorithm 12 includes an object path prediction processor 22 and a roadway estimation processor 24 that receive the sensor information from the sensor fusion sub-system 18, as will be discussed in further detail below. Additionally, the core algorithm 12 includes a vehicle state estimation processor 26 that receives the vehicle speed, yaw rate and steering angle information from the sensors 20 and provides predicted vehicle path and vehicle state information, as will also be described in further detail below. The core algorithm 12 also includes a threat assessment processor 28 that receives path prediction signals and roadway estimation signals from the processors 22 and 24, and determines if neighboring vehicles may cause potential collision problems during lane changing maneuvers. The threat assessment processor 28 analyzes the lane and traffic information, and if a collision is predicted during the lane changing maneuver, the maneuver is aborted and yields the control to the lane centering.

The LXACC core algorithm 12 also includes a desired path generation processor 30, also discussed below, that generates the desired path of the vehicle for lane centering and lane changing purposes, such as disclosed in the '439 application referenced above. The described path signal from the processor 30 is sent to a lane change lane center control processor 32 for providing a steering angle command based on the desired path generation from the processor 30. The control processor 32 generates a sequence of future steering angle commands that minimize the orientation and offset errors between the vehicle's desired path and the predicted vehicle path.

The steering angle command signal is sent to a vehicle steering controller 34 that controls a vehicle steering system. The controller 34 controls brake and throttle at box 38 of the vehicle and an electric power steering (EPS) system 40 of the vehicle. The system 10 assumes that the vehicle steering sub-system 34 has an angle overlay or a torque overlay function so that the system 10 can control the steering angle. The system 10 decouples the longitudinal motion control from the lateral control so that the longitudinal control is not considered in the same framework as the lateral control. Instead, the system 10 sends a desired longitudinal speed to a smart adaptive cruise control sub-system 36 if the current vehicle speed needs to be adjusted to maintain a comfortable lane centering or lane changing maneuver. If high lateral acceleration is expected during the lane change maneuver, for example, on a sharp curve road, the system 10 first tries a lane change with longer lane change execution times. If the lateral acceleration still exceeds a certain limit with the lane change execution time, the system 10 reduces the vehicle speed.

The system 10 also includes a human machine interface (HMI) controller 42 that takes driver inputs of engagement and disengagement of the system 10 and delivers them to the LXACC core algorithm 12. The LXACC core algorithm 12 sends the operating status, diagnosis messages and instruction messages to the HMI controller 42 and the HMI controller 42 processes the signals through various devices 44, such as an LCD display, haptic seat, audio warnings, steering wheel vibrations, etc.

Figure 2:
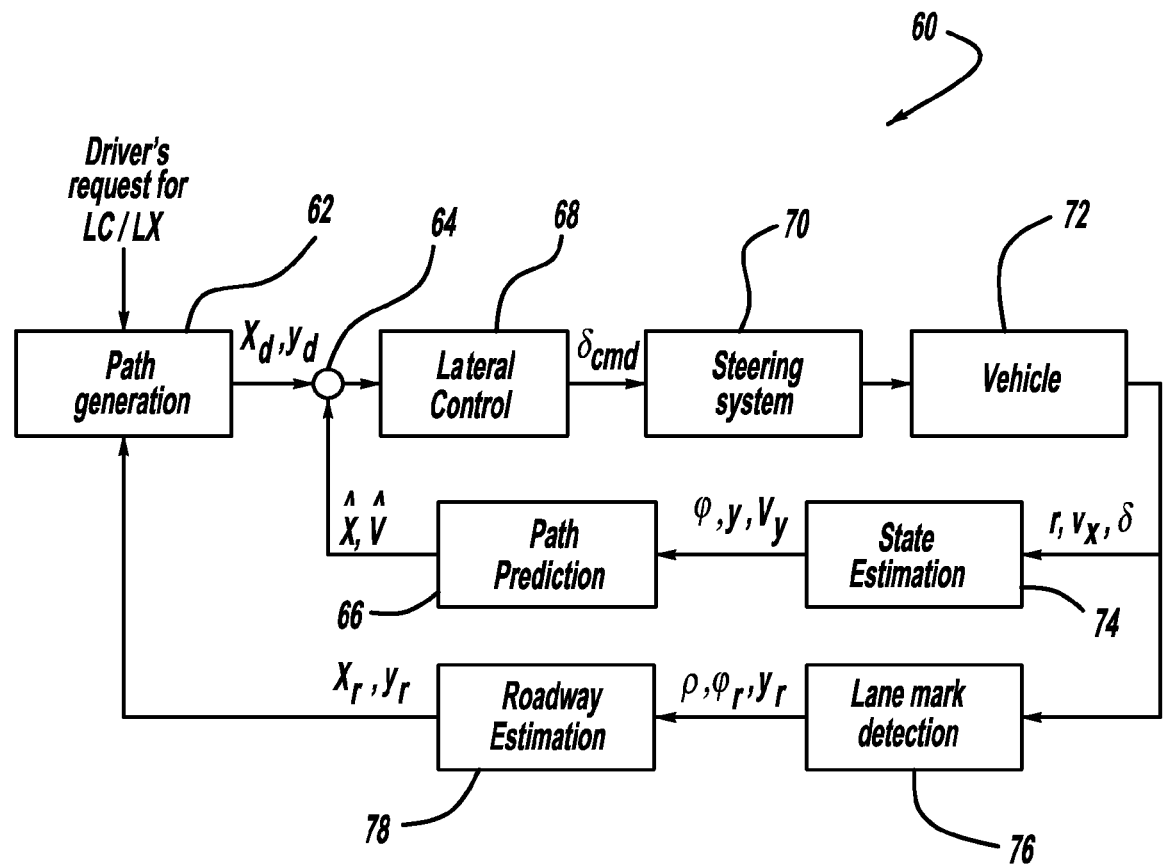
FIG. 2 is a block diagram of a path prediction system used in the LXACC system shown in FIG. 1.

FIG. 2 is a schematic block diagram of an LXACC system 60 that provides path control for a vehicle when changing lanes, either on a straight road or a curved road, and lane centering in an autonomous or semi-autonomous vehicle system, such as in the system 10 shown in FIG. 1. The system 60 includes a desired path generation processor 62 that receives a drivers request for a lane change. The desired path generation processor 62 generates a smooth path for the vehicle when turning that does not have abrupt changes that would otherwise provide passenger discomfort as discussed in detail in the '439 application. The system 60 produces a steering angle command δ to guide the vehicle along the generated path.

The desired path is represented as a series of lateral offsets, heading angles and longitudinal distances over a time period that the lane change will take place. This path information is provided to a comparator 64 that receives a signal from a path prediction processor 66 and provides an error signal between the desired path and the predicted path. The lateral speed $v_y$, the yaw angle $\phi$ and the lateral position $y_r$ of the vehicle are predicted over the pre-defined lane change completion time.

Figure 3:
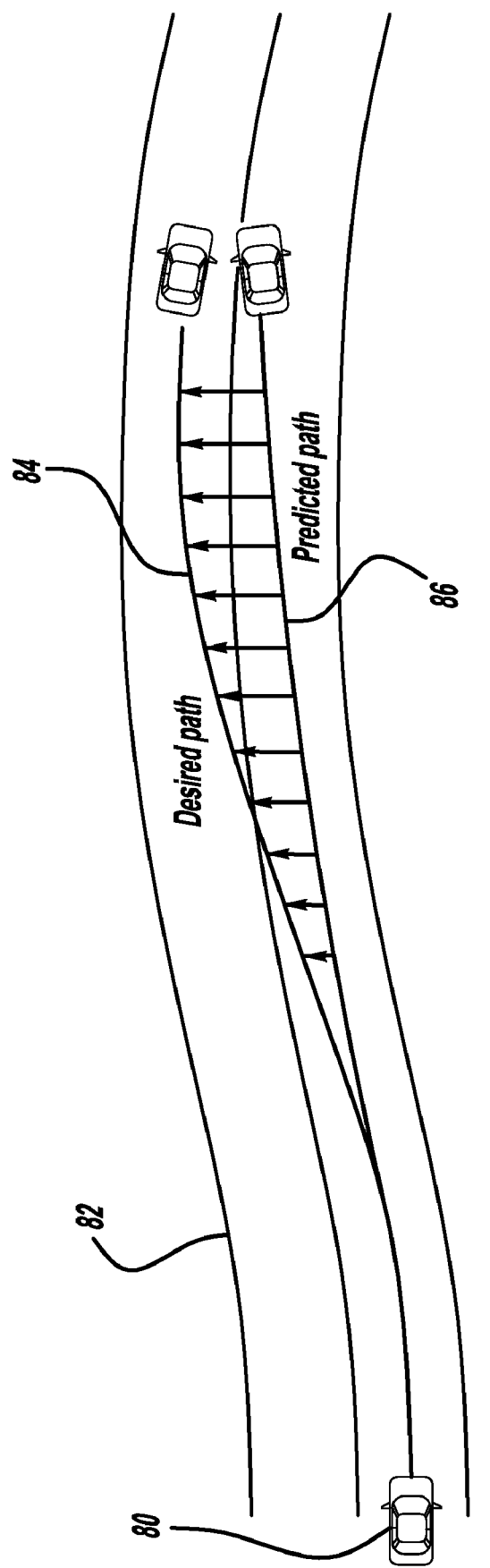
FIG. 3 is an illustration of a vehicle traveling on a roadway showing a predicted path and a discussed path.

FIG. 3 is an illustration of a vehicle 80 traveling on a roadway 82 showing a desired path 84 for a lane change maneuver as generated by the path generation processor 62 and a predicted path 86 that is generated by the path prediction processor 66.

The forward vision system calculates the roadway lane markings information, such as vehicle lateral offset $y_r$, roadway curvature $\rho$ and vehicle yaw angle $\phi_r$ with respect to the vehicle's centered coordinate system at the box 62. The roadway is modeled as a second order polynomial equation as:

$$y_r(x) = Ax^2 + Bx + C, \quad 0 \leq x \leq x_{range} \tag{1}$$

Where $x_{range}$ represents the range of the forward vision camera.

From the geometric relationship between the roadway and the roadway representation of equation (1), the coefficients of equation (1) with the measured roadway parameters $y_r$, $\rho$ and $\phi_r$ can be related as:

$$A = \frac{\rho}{2} \tag{2}$$

$$B = \tan\varphi_r$$

$$C = y_r(0)$$

After the roadway model of equation (1) is obtained, the roadway lateral position $y_r$ and the yaw angle $\phi_r$ can be predicted at the box 66 over the pre-defined lane change completion time using a vehicle dynamic model:

$$\dot{x}_r = A_r x_r + B_r \delta + G_r \rho \tag{3}$$

$$z_r = C_r x_r$$

With:

$$x_r = [y_r \ \varphi_r \ v_y \ r]^T$$

$$B_r = \left[0 \ 0 \ \frac{C_f}{m} \ \frac{aC_f}{I}\right]^T$$

$$C_r = \begin{bmatrix} 1 & 0 & 0 & 0 \\ 0 & 1 & 0 & 0 \end{bmatrix}$$

$$G_r = [0 \ v_x \ 0 \ 0]^T$$

$$A_r = \begin{bmatrix} 0 & v_x & -1 & 0 \\ 0 & 0 & 0 & -1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & -\frac{a^2C_f + b^2C_r}{Iv_x} \end{bmatrix}$$

Where $C_f$ and $C_r$ are the concerning stiffnesses of front wheels and rear wheels of the vehicle, respectively, a and b are the distances from the center of gravity of the vehicle to the front and rear axles, respectively, m is the vehicle mass, δ is the steering angle and $I_z$ is the moment of inertia around the center of mass of the vehicle perpendicular to the plane where the vehicle is located.

Given the roadway lateral offset $y_r$, the heading angle $\phi_r$ and roadway curvature $\rho$, the path-generation function at the box 62 generates a smooth desired path appropriate for a single lane changing maneuver. The path should be smooth and satisfy the vehicles dynamic capability. The desired path is obtained without an abrupt change or discontinuity in the sense of the second order geometric continuity. With these considerations, a fifth order polynomial equation for the desired path generation problem is provided as:

$$y_d(t) = a_5 x_d^5(t) + a_4 x_d^4(t) + a_3 x_d^3(t) + a_2 x_d^2(t) + a_1 x_d^1(t) + a_0 \quad (4)$$

The fifth order polynomial path generation captures the roadway parameters $y_r$, $\rho$ and $\phi_r$ at the beginning and the end of a lane change maneuvering and guarantees the smoothness of the path up to the second order path derivatives. In addition, the path generation can be obtained by a few simple algebraic computations using the road geometry measurement, thus it does not require heavy computing power.

The error signal from the comparator 64 is applied to a lane change controller 68 that provides a steering angle command signal $\delta_{cmd}$ for the lane change that minimizes the error signal. The lane change controller 68 generates a sequence of future steering angle commands that minimize the orientation and offset errors between the vehicles desired path and the predicted vehicle path, as will be described in further detail below.

The lateral motion control algorithm compares the predicted vehicle path with the vehicles desired path $(x_d, y_d)$, and calculates the steering angle command signal $\delta_{cmd}$ by minimizing the path difference, where the steering angle command signal $\delta_{cmd}$ is obtained by:

$$\delta_{cmd}(k) = \frac{\sum_{i=0}^{N-1} (z_d(k+i+1) - CA^{i+1}x(k))^T Q(k+i+1)(CA^i B)}{\sum_{i=0}^{N-1} (CA^i B) Q(k+i+1)(CA^i B) + R(k)} \quad (5)$$

Where $x = [y \phi v_y r]^T$, $z_d(k) = [y_d \phi_d]^T$, Q and R are weighting matrices used in the minimization with the system matrices definitions $$A = e^{A_r t_s},$$

$$B = \int_0^{t_s} e^{A_r \alpha} B_r \, d\alpha \text{ and}$$

$$C = \begin{bmatrix} 1 & 0 & 0 & 0 \\ 0 & 1 & 0 & 0 \end{bmatrix}.$$

The steering angle command signal $\delta_{cmd}$ is then sent to a steering system 70 that provides the steering control of a vehicle 72. The steering system 70 receives the steering angle command signal $\delta_{cmd}$ and controls the steering angle to achieve the desired steering angle as commanded.

As the vehicle turns, various sensors on the vehicle 72, such as a steering angle sensor, speedometer and yaw rate sensor, provide measured signals of the motion of the vehicle 72. These measured vehicle motion signals are sent back to the desired path generation processor 62. The vehicle 72 also includes vision devices, such as cameras. Several inertial sensors, such as a speedometer, a rate gyro and a steering angle sensor, are used to measure vehicle states, such as longitudinal speed $v_x$, vehicle yaw rate r and steering angle $\delta$. No sensor is installed in the vehicle 72 for direct measurement of the lateral speed $v_y$. The lateral speed estimation can be described as:

$$\begin{bmatrix} \dot{\hat{v}}_y \\ \dot{\hat{r}} \end{bmatrix} = \begin{bmatrix} -\frac{C_f + C_r}{mv_x} & \frac{bC_r - aC_f}{mv_x} - v_x \\ \frac{bC_r - aC_f}{Iv_x} & -\frac{a^2 C_f + b^2 C_r}{Iv_x} \end{bmatrix} \cdot \begin{bmatrix} \hat{v}_y \\ \hat{r} \end{bmatrix} + \begin{bmatrix} \frac{C_f}{m} \\ \frac{aC_f}{I} \end{bmatrix} \cdot \delta + K \cdot \begin{bmatrix} 0 \\ r - \hat{r} \end{bmatrix} \quad (6)$$

Where r is a measured vehicle yaw rate, $\hat{v}_y$ and $\hat{r}$ are the estimated lateral speed and the vehicle yaw rate, respectively, and K is a yaw rate observer gain.

The vehicle motion information is provided to a vehicle state estimation processor 74 that provides estimated vehicle state signals, namely, vehicle longitudinal speed $v_x$, vehicle lateral speed $v_y$, and vehicle yaw rate r. The vehicle state estimation processor 74 uses a vehicle model to filter the estimated vehicle state signals. The state signals are sent to the path prediction processor 66 that predicts the vehicle path for the next few instances in time based on that information. The path prediction processor 66 estimates the vehicle future path based on the current vehicle speed $v_x$, yaw rate r and steering angle $\delta$.

The camera signals from the vision devices and the filtered sensor signals from the vehicle 72 are also provided to a lane mark detection processor 76 that corrects the parameters of the lane markings based on the motion of the vehicle 72. The lane mark detection processor 76 recognizes the lane markings and represents them with the parameters of lane curvature, tangential angle and lateral offset, where the output of the lane mark detection processor 76 is the heading angle $\phi_r$ and the curvature $\rho$ of the road. The position of the lane markings relative to the vehicle 72 is then sent to the desired path generation processor 62 through a roadway estimation processor 78 to provide the desired path generation updating. The path generation processor 62 generates a smooth desired path for a lane change according to the vehicle dynamics and the detected lane marks.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing vehicle steering control in an autonomous or semi-autonomous vehicle driving system, said method comprising:
   determining a lateral position of the vehicle, a lateral speed of the vehicle, a yaw rate of the vehicle and a yaw angle of the vehicle at a particular point in time or over a predetermined time period;
   determining roadway lane marking information of a roadway on which the vehicle is traveling;
   modeling the roadway using the roadway lane marking information, wherein modeling the roadway includes modeling the roadway as a second order polynomial equation;
   predicting a vehicle path using the roadway model;

providing a desired vehicle path;
comparing the predicted vehicle path and the desired vehicle path to generate a path error value; and
generating a steering angle command based on the path error value where the steering angle command is determined by a function that includes the vehicle lateral position, vehicle lateral speed, vehicle yaw rate and vehicle yaw angle.

2. The method according to claim 1 wherein determining roadway lane marking information includes determining the vehicle lateral position, roadway curvature and the vehicle yaw angle.

3. The method according claim 1 wherein predicting the vehicle path using the roadway model includes predicting the roadway lateral position and the vehicle yaw angle.

4. The method according to claim 3 wherein predicting the roadway lateral position and the vehicle yaw angle includes using the equation:

$$\dot{x}_r = A_r x_r + B_r \delta + G_r \rho$$
$$z_r = C_r x_r$$

where:

$$x_r = [y_r \ \varphi_r \ v_y \ r]^T$$

$$B_r = \begin{bmatrix} 0 & 0 & \frac{C_f}{m} & \frac{aC_f}{I} \end{bmatrix}^T$$

$$C_r = \begin{bmatrix} 1 & 0 & 0 & 0 \\ 0 & 1 & 0 & 0 \end{bmatrix}$$

$$G_r = [0 \ v_x \ 0 \ 0]^T$$

$$A_r = \begin{bmatrix} 0 & v_x & -1 & 0 \\ 0 & 0 & 0 & -1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & -\frac{a^2 C_f + b^2 C_r}{Iv_x} \end{bmatrix}$$

and where $C_f$ and $C_r$ are the concerning stiffnesses of front wheels and rear wheels of the vehicle, respectively, a and b are the distances from the center of gravity of the vehicle to the front and rear axles, respectively, m is the vehicle mass, $\delta$ is the steering angle and $I_z$ is the moment of inertia around the center of mass of the vehicle perpendicular to the plane where the vehicle is located.

5. The method according to claim 1 wherein providing the desired vehicle path includes providing the desired vehicle path using a roadway lateral offset of the vehicle and a vehicle heading angle.

6. The method according to claim 5 wherein providing a desired vehicle path includes generating a fifth order polynomial path based on the equation:

$$y_d(t) = a_5 x_d^5(t) + a_4 x_d^4(t) + a_3 x_d^3(t) + a_2 x_d^2(t) + a_1 x_d^1(t) + a_0$$

where y is the lateral offset.

7. The method according to claim 1 wherein providing a steering angle command includes providing a steering angle command defined by the equation:

$$\delta_{cmd}(k) = \frac{\sum_{i=0}^{N-1} (z_d(k+i+1) - CA^{i+1}x(k))^T Q(k+i+1)(CA^i B)}{\sum_{i=0}^{N-1} (CA^i B) Q(k+i+1)(CA^i B) + R(k)}$$

where $x=[y \phi v_y r]^T$, $z_d(k)=[y_d \phi_d]^T$, Q and R are weighting matrices used in the minimization with system matrices definitions $$A = e^{A_r t_s},$$
$$B = \int_0^{t_s} e^{A_r \alpha} B_r \, d\alpha \text{ and}$$
$$C = \begin{bmatrix} 1 & 0 & 0 & 0 \\ 0 & 1 & 0 & 0 \end{bmatrix},$$

y is lateral position, $\phi$ is yaw angle, $v_y$ is lateral speed and r is yaw rate.

8. A method for providing vehicle steering control in an autonomous or semi-autonomous vehicle driving system, said method comprising:
determining roadway lane marking information of a roadway on which the vehicle is traveling including determining vehicle lateral position, roadway curvature and vehicle yaw angle;
modeling the roadway as a second order polynomial equation using the roadway lane marking information;
predicting a vehicle path using the roadway model including predicting a roadway lateral offset and a vehicle yaw angle;
providing a desired vehicle path;
comparing the predicted vehicle path and the desired vehicle path to generate a path error value; and
generating a steering angle command based on the path error value, wherein providing a steering angle command includes providing a steering angle command defined by the equation:

$$\delta_{cmd}(k) = \frac{\sum_{i=0}^{N-1} (z_d(k+i+1) - CA^{i+1}x(k))^T Q(k+i+1)(CA^i B)}{\sum_{i=0}^{N-1} (CA^i B) Q(k+i+1)(CA^i B) + R(k)}$$

where $x=[y \phi v_y r]^T$, $z_d(k)=[y_d \phi_d]^T$, Q and R are weighting matrices used in the minimization with system matrices definitions $$A = e^{A_r t_s},$$
$$B = \int_0^{t_s} e^{A_r \alpha} B_r \, d\alpha \text{ and}$$
$$C = \begin{bmatrix} 1 & 0 & 0 & 0 \\ 0 & 1 & 0 & 0 \end{bmatrix},$$

y is lateral position, $\phi$ is yaw angle, $v_y$ is lateral speed and r is yaw rate.

9. The method according to claim 8 wherein predicting a roadway lateral position and vehicle yaw angle includes using the equation:

$$\dot{x}_r = A_r x_r + B_r \delta + G_r \rho$$

$$z_r = C_r x_r$$

where:

$$x_r = [y_r \ \varphi_r \ v_y \ r]^T$$

$$B_r = \begin{bmatrix} 0 & 0 & \dfrac{C_f}{m} & \dfrac{aC_f}{I} \end{bmatrix}^T$$

$$C_r = \begin{bmatrix} 1 & 0 & 0 & 0 \\ 0 & 1 & 0 & 0 \end{bmatrix}$$

$$G_r = [0 \ v_x \ 0 \ 0]^T$$

$$A_r = \begin{bmatrix} 0 & v_x & -1 & 0 \\ 0 & 0 & 0 & -1 \\ 0 & 0 & -\dfrac{C_f + C_r}{mv_x} & \dfrac{bC_r - aC_f}{mv_x} - v_x \\ 0 & 0 & \dfrac{bC_r - aC_f}{Iv_x} & -\dfrac{a^2 C_f + b^2 C_r}{Iv_x} \end{bmatrix}$$

and where $C_f$ and $C_r$ are the concerning stiffnesses of front wheels and rear wheels of the vehicle, respectively, a and b are the distances from the center of gravity of the vehicle to the front and rear axles, respectively, m is the vehicle mass, $\delta$ is the steering angle and $I_z$ is the moment of inertia around the center of mass of the vehicle perpendicular to the plane where the vehicle is located.

10. The method according to claim 8 wherein determining a desired vehicle path includes generating a fifth order polynomial path based on the equation:

$$y_d(t) = a_5 x_d^5(t) + a_4 x_d^4(t) + a_3 x_d^3(t) + a_2 x_d^2(t) + a_1 x_d^1(t) + a_0$$

where y is the lateral offset.

11. A system for providing vehicle steering control in an autonomous or semi-autonomous vehicle driving system, said system comprising:
   means for determining a lateral position of the vehicle, a lateral speed of the vehicle, a yaw rate of the vehicle and a yaw angle of the vehicle at a particular point in time or over a predetermined time period;
   means for determining roadway lane marking information of a roadway on which the vehicle is traveling;
   means for modeling the roadway using the roadway lane marking information that models the roadway as a second order polynomial equation;
   means for predicting a vehicle path using the roadway model;
   means for providing a desired vehicle path;
   means for comparing the predicted vehicle path and the desired vehicle path to generate a path error value; and
   means for generating a steering angle command based on the path error value where the steering angle command is determined by a function that includes the vehicle lateral position, vehicle lateral speed, vehicle yaw rate and vehicle yaw angle.

12. The system according to claim 11 wherein the means for determining roadway lane marking information determines the vehicle lateral position, roadway curvature and the vehicle yaw angle.

13. The system according to claim 11 wherein the means for predicting the vehicle path predicts a roadway lateral position and the vehicle yaw angle over a predetermined steering completion time.

14. The system according to claim 13 wherein the means for predicting the roadway lateral position and the vehicle yaw angle uses the equation:

$$\dot{x}_r = A_r x_r + B_r \delta + G_r \rho$$

$$z_r = C_r x_r$$

where:

$$x_r = [y_r \ \varphi_r \ v_y \ r]^T$$

$$B_r = \begin{bmatrix} 0 & 0 & \dfrac{C_f}{m} & \dfrac{aC_f}{I} \end{bmatrix}^T$$

$$C_r = \begin{bmatrix} 1 & 0 & 0 & 0 \\ 0 & 1 & 0 & 0 \end{bmatrix}$$

$$G_r = [0 \ v_x \ 0 \ 0]^T$$

$$A_r = \begin{bmatrix} 0 & v_x & -1 & 0 \\ 0 & 0 & 0 & -1 \\ 0 & 0 & -\dfrac{C_f + C_r}{mv_x} & \dfrac{bC_r - aC_f}{mv_x} - v_x \\ 0 & 0 & \dfrac{bC_r - aC_f}{Iv_x} & -\dfrac{a^2 C_f + b^2 C_r}{Iv_x} \end{bmatrix}$$

and where $C_f$ and $C_r$ are the concerning stiffnesses of front wheels and rear wheels of the vehicle, respectively, a and b are the distances from the center of gravity of the vehicle to the front and rear axles, respectively, m is the vehicle mass, $\delta$ is the steering angle and $I_z$ is the moment of inertia around the center of mass of the vehicle perpendicular to the plane where the vehicle is located.

15. The system according to claim 11 wherein the means for providing the desired vehicle path provides the desired vehicle path using a roadway lateral offset of the vehicle and a vehicle heading angle.

16. The system according to claim 11 wherein the means for determining a desired vehicle path includes generating a fifth order polynomial path based on the equation:

$$y_d(t) = a_5 x_d^5(t) + a_4 x_d^4(t) + a_3 x_d^3(t) + a_2 x_d^2(t) + a_1 x_d^1(t) + a_0$$

where y is the lateral offset.

17. The system according to claim 11 wherein the means for providing a steering angle command provides a steering angle command defined by the equation:

$$\delta_{cmd}(k) = \dfrac{\sum_{i=0}^{N-1}(z_d(k+i+1) - CA^{i+1}x(k))^T Q(k+i+1)(CA^i B)}{\sum_{i=0}^{N-1}(CA^i B)Q(k+i+1)(CA^i B) + R(k)}$$

where $x = [y \phi v_y r]^T$, $z_d(k) = [y_d \phi_d]^T$, Q and R are weighting matrices used in the minimization with system matrices definitions $$A = e^{A_r t_s},$$

$$B = \int_0^{t_s} e^{A_r \alpha} B_r d\alpha \text{ and}$$

$$C = \begin{bmatrix} 1 & 0 & 0 & 0 \\ 0 & 1 & 0 & 0 \end{bmatrix},$$

y is lateral position, $\phi$ is yaw angle, $v_y$ is lateral speed and r is yaw rate.

* * * * *